United States Patent [19]

Dougherty

[11] Patent Number: 5,085,519
[45] Date of Patent: Feb. 4, 1992

[54] BEARING ASSEMBLY WITH SPEED SENSOR AND PROCESS FOR ASSEMBLING THE SAME

[75] Inventor: John D. Dougherty, North Canton, Ohio

[73] Assignee: The Timken Company, Canton, Ohio

[21] Appl. No.: 726,253

[22] Filed: Jul. 5, 1991

[51] Int. Cl.⁵ .............................................. F16C 19/38
[52] U.S. Cl. .................................... 384/448; 384/446; 324/173
[58] Field of Search ....................... 384/448, 446, 173; 324/173, 174

[56] References Cited

U.S. PATENT DOCUMENTS

| | | | |
|---|---|---|---|
| 3,500,091 | 3/1970 | Jones | 310/168 |
| 3,801,845 | 4/1974 | Gavitt | 310/168 |
| 4,778,286 | 10/1988 | Kadokawa | 384/446 |
| 4,864,231 | 9/1989 | Okumura et al. | 324/173 |
| 5,011,302 | 4/1991 | Mott et al. | 384/448 |
| 5,011,303 | 4/1991 | Caron | 384/446 |

FOREIGN PATENT DOCUMENTS 0137270  4/1985  European Pat. Off. .

Primary Examiner—Lenard A. Footland
Attorney, Agent, or Firm—Gravely, Lieder & Woodruff

[57] ABSTRACT

A double row tapered roller bearing, which has the capacity to produce a pulsating electrical signal, the frequency of which reflects angular velocity, includes an outer race having a pair of tapered raceways that are presented inwardly, two cones, each having a tapered raceway that is presented outwardly toward a different raceway of the outer race, and tapered rollers arranged in two rows between the raceways of the outer race and the cones, with the small ends of the tapered rollers in each row being presented toward space between the two rows. The outer race has an oblique bore which opens into the space, whereas one of the cones has an axially directed seat which extends into the space. The oblique bore contains a sensor while the axially directed seat has a target wheel fitted over it, and the target wheel has an oblique operative surface that is presented opposite the inner end of the sensor, there being a slight gap between the two. The size of the gap depends on the axial position of the target wheel. During assembly, the target wheel is forced over the axially directed seat of the one cone, while that cone and its row of tapered rollers are in the outer race, and the advance of the target wheel is monitored by a gage in the oblique bore. When the gage registers a prescribed distance between the operative surface and a reference surface on the outer race, the advance is terminated, the gage is withdrawn, and the sensor is installed. This ensures that the gap between the inner end of the sensor and the operative surface of the sensor will be the proper size.

12 Claims, 2 Drawing Sheets

BEARING ASSEMBLY WITH SPEED SENSOR AND PROCESS FOR ASSEMBLING THE SAME

BACKGROUND OF THE INVENTION

This invention relates in general to bearings and more particularly to a bearing assembly that is capable of monitoring angular velocity and a process for assembling the same.

The automotive industry has turned to antilock brake systems to improve control over vehicles when the brakes of such vehicles are applied, particularly during emergency stops and braking on slippery surfaces. An antilock brake system must monitor the speed of each wheel to detect whenever a wheel locks up and begins to skid, so that the system may relax the braking effort applied to that wheel, at least to the point that the wheel again begins to rotate. With all wheels rotating, the driver maintains better control over the vehicle.

Typically, the hub for each road wheel carries a target or exciter wheel which rotates with the road wheel at the same angular velocity. As the target wheel turns, its periphery moves past a sensor which is generally fixed in position on the vehicle. The moving target wheel causes the sensor to generate a signal which may appear as a sine wave or simply as pulses, but in any event is characterized by a frequency, and that signal along with corresponding signals from all of the other wheels are processed by a controller. Thus, the controller will sense when any one of the wheels locks up or rotates at a diminished velocity. On most automotive vehicles of current manufacture, the target wheels exist on the exterior surfaces of the wheel hubs where they are exposed to contaminants such as dirt and dust, as well as to corrosive chemicals. These substances may damage the target wheel or lodge in the gap between the target wheel and the sensor and thereby disrupt the sensor.

The bearing assemblies on which the hubs rotate of course have seals for isolating raceways and the rolling elements within them from the contaminants to which the exterior of the hub is subjected. Others have recognized that these seals may likewise be used to protect a target wheel and to isolate the gap that exists between the target wheel and the sensor, so that sand, dirt and other solid objects do not enter the gap. After all, the size and integrity of the gap are quite important, at least where the sensor is the typical variable reluctance type, which is the type most commonly used on antilock braking systems, because the voltage produced by the sensor varies in inverse proportion to the size of the gap. That voltage of course represents the signal delivered to the processor of the antilock braking system, and it must be strong enough to be detected. Some bearing assemblies are assembled without any regard for the size of the gap between the target wheel and sensor, that is to say, the assembly procedure does not include, nor does the bearing assembly provide for an adjustment of the gap. In this type of bearing assembly tolerances may accumulate and render the size of the gap excessive. Other bearing assemblies provide means for adjusting the position of the sensor, but they usually represent an extra part or two and added complication in the assembly procedure.

The present invention resides in a bearing assembly having a target wheel isolated between the seals of the bearings where it is monitored by a sensor. The target wheel has an operative surface which is beveled with respect to the axis of rotation for the bearing and the sensor lies along an axis which is oblique to the bearing axis and perpendicular to the operative surface of the target wheel. The gap between the sensor and the target wheel depends on the axial position of the target wheel, and indeed the target wheel is moved axially over one of the races while a gage measures the distance between the operative surface and a reference surface that is later used to locate the sensor.

DESCRIPTION OF DRAWINGS

In the accompanying drawings which form part of the specification and wherein like numerals and letters refer to like parts wherever they occur.

DETAILED DESCRIPTION

Figure 1:
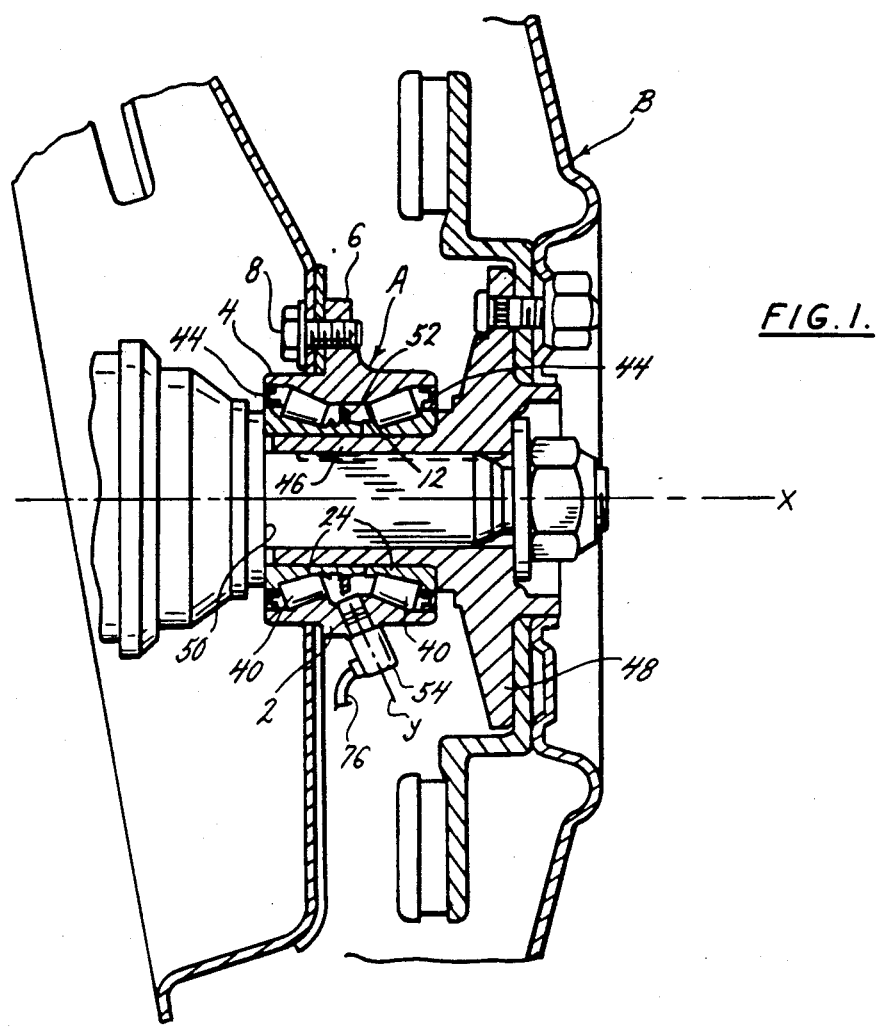
FIG. 1 is a sectional view of a bearing assembly constructed in accordance with and embodying the present invention, with the bearing assembly being fitted to an automotive suspension system and attached to a road wheel.

Referring now to the drawings, a bearing assembly A (FIG. 1) couples a road wheel B to the suspension system of an automotive vehicle, particularly to a component C of the suspension system, such as, a steering knuckle or a trailing swing arm, and enables the wheel B to rotate about an axis x of rotation, which is, of course, the axis of the bearing assembly A. It may be used with either driven or nondriven wheels, and insofar as the former is concerned, it further serves to couple a drive shaft or drive axle to the road wheel B. It may also be used with either front or rear wheels. Aside from coupling the wheel B to a component C of the suspension system, the bearing assembly A further generates an electrical signal which is responsive to the rotation of the wheel B and, indeed, represents the angular velocity at which the wheel B revolves about the axis x. This enables a controller in an antilock brake system to monitor the angular velocity of the wheel B.

The bearing assembly A includes an outer race 2 having a generally cylindrical external surface 4 and several mounting flanges 6 (FIG. 1) which project outwardly from the surface 4 at circumferentially spaced intervals. The cylindrical surface 4 fits into an aperture of equivalent size in the component C of the suspension system, bringing the flanges 6 against the component C, and indeed, the outer race 2 is held fast within the component C by bolts 8 which pass through the flanges 6. The outer race 2 is hollow and generally tubular and has a pair of tapered raceways 10 (FIG. 2) which face inwardly toward the axis x of rotation and taper downwardly toward an intervening surface 12 located generally midway between the ends of the race 2. Actually, the outer race 2 constitutes a double cup of the type identified with double row tapered roller bearings. The raceways 10 lead out to end bores 14 which create annular extensions 16 beyond the raceways 10. The outer race 2 also has an oblique bore 18 which opens into the interior of the race 2 through the intervening surface 12, its axis y being oblique to the axis x of rotation. The bore 18 lies within the thickest portion of the outer race and indeed exists not only in the region between the two raceways 10, but also within a boss 20 that projects from the generally cylindrical outer surface of the race 2. Indeed, the oblique bore 18 opens outwardly through a spot surface 22 which is milled or otherwise machined perpendicular to the oblique axis y of the bore 18. Aside from the oblique bore 18, the boss 20 also contains a threaded hole 23 (FIG. 5) which is offset circumferentially from the oblique bore 18 and lies parallel to it.

Figure 2:
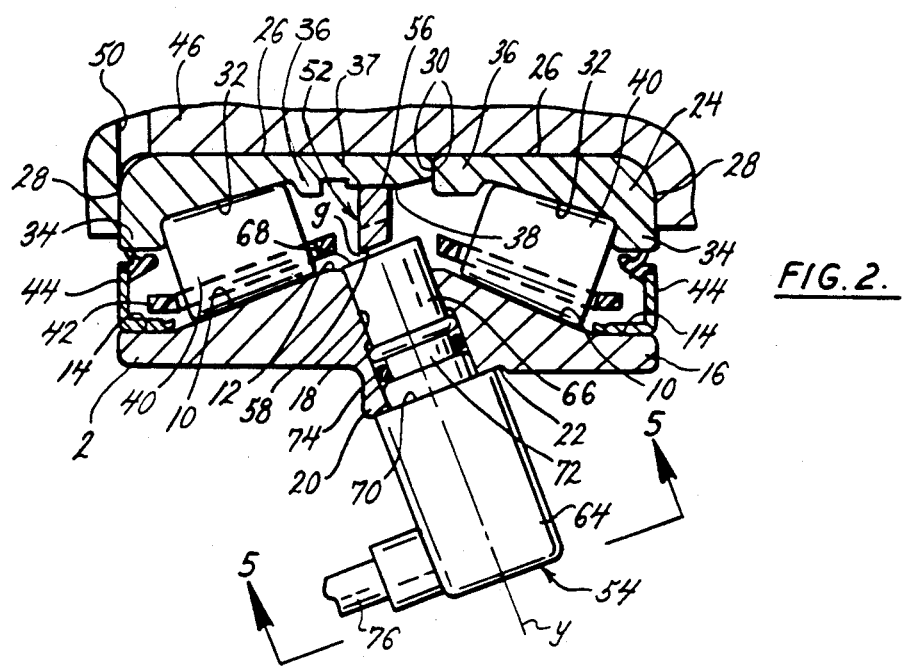
FIG. 2 is an enlarged partial sectional view of the bearing assembly.

The bearing assembly A also includes an inner race which revolves within the tubular outer race 2. Actually, the inner race constitutes two races which take the form of cones 24, each of which is surrounded by a different raceway 10 of the outer race 2 (FIG. 2). Each cone 24 contains a bore 26 which at one end leads out to a back face 28 and at the other end to a front face 30. Indeed, the two cones 24 abut at their front faces 30 within the interior of the outer race 2, so the back faces 28 are presented outwardly at the ends of the bearing A. On its outwardly presented surface, each cone 24 has a tapered raceway 32 which is presented opposite one of the raceways 10 of the outer race 2 and tapers in the same direction, that is, downwardly toward the midregion of the outer race 2. At the large end of its raceway 32 each cone 24 has a thrust rib 34 which projects radially beyond the raceway 32 and extends axially out to the back face 28, which is in fact on the end of the thrust rib 34. The thrust rib 34 revolves within the region of the outer race 2 that is circumscribed by one of the annular extensions 16 on the outer race 2. At its small end, the tapered raceway 32 leads out to an end rib 36 which projects radially slightly beyond that end of the raceway 32, and the front face 30 for the cone 24 exists on the end rib 36.

This one cone 24 is of normal length and is otherwise conventional. Its end rib 36 lies at its inner end and carries the front face 30. The other cone 24, in contrast, is of extended length, for it has an axial extension 37 projecting from its end rib 36, and the extension 37 carries the front face 30. The extension 37 is of lesser diameter then the end rib 36, and between its ends is provided with a raised seat 38 that is ground cylindrical to within close dimensional tolerances. Its axial centerline coincides with the axis x of rotation. The two cones 24 abut within the outer race 2 with the abutment being along the front faces 30. By reason of the differences in length of cones 24, their abutting front faces 30 are axially offset toward one end of the intervening surface 12 in the outer race 2.

The raceways 10 and 32 of the outer race 2 and the cones 24, respectively, are thus arranged in pairs, there being within each raceway 10 of the outer race 2 a corresponding raceway 32 on one of the cones 24 (FIG. 2). In addition to the outer race 2 and the two cones 24, the bearing assembly A has a complement of tapered rollers 40 arranged in two rows, there being a separate row of rollers 40 between each pair of raceways 10 and 32. Within each row, the side faces of the rollers 40 bear against and roll along the two raceways 10 and 32 for that row, while the large end faces of the rollers 40 bear against the thrust rib 34 at the end of the raceway 32 for that row. The rollers 40 of the two rows are confined within cages 42 which distribute the rollers 40 uniformly in their respective rows and thereby maintain the proper spacing between the rollers 40. They also retain the rollers 40 around the cones 24 when the cones 24 are withdrawn from the outer race 2. To install the rollers 40 and cage 42 around the conventional cone 24 with the short end rib 36, the rollers 40 and cage 42 as a unit are passed over the small end rib 36, with the cage 42 somewhat enlarged to accommodate the end rib 36. Then the cage 42 is deformed inwardly to trap the rollers 40 between the thrust end ribs 34 and 36 for the cone 24. This is a conventional bearing assembly procedure. Being of reduced diameter, the axial extrusion 37 of the one cone 24 does not interfere with the installation of the rollers 40 and cage 42.

The rollers 40 transmit radial loads between the outer race 2 and the cones 24, while reducing friction to a minimum, but the taper of the raceways 10 and 32 converts the transmitted radial forces into relatively small axial forces which urge the rollers 40 toward the ends of the bearing assembly A. The thrust ribs 34 prevent the rollers 40 from being expelled.

The ends of the bearing assembly A are closed by seals 44 (FIG. 2) which fit into the annular spaces between the extensions 16 on the outer race 2 and the thrust ribs 34 on the two cones 24 that form the inner race. Each seal 44 includes a metal case which is pressed into the end bore 14 of one of the extensions 16 for the outer race 2 and an elastomeric sealing element which is bonded to the case and establishes a live or dynamic barrier along the cylindrical surface of the thrust rib 34 for the cone 24 at which it is located. U.S. Pat. No. 4,770,548 illustrates and describes a suitable seal construction for the seals 44.

Whereas the outer race 2 fits into and is bolted to a component C of a vehicle suspension system, the cones 24 that form the inner race fit over a spindle 46 having a flange 48 to which the road wheel B is attached (FIG. 1). In this regard, the bores 26 for the two cones 24 are such that an interference fit exists between the cones 24 and the spindle 46. Moreover, the cones 24 are clamped between the flange 48 of the spindle 52 and another surface 50 at the end of the spindle 46.

The capacity to detect rotation of the spindle 46 within the outer race 2 and indeed to measure the relative angular velocity of that rotation derives from a target wheel 52 which fits over the extended cone 24 and a sensor 54 which fits within the oblique bore 18 of the outer race 2. When the periphery of the target wheel 52 moves past the inner end of the sensor 54 by reason of the rotation, the sensor 54 produces an electrical signal which has a frequency, and that frequency represents the angular velocity—indeed, it is directly proportional to the angular velocity.

Figure 4:
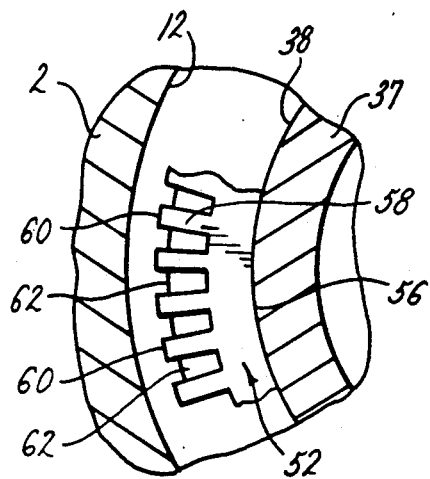
FIG. 4 is a fragmentary sectional view taken along line 4—4 of FIG. 3 and showing the target wheel.

Preferably, the target wheel 52 is formed from a magnetic substance such as steel. It has a bore 56, which is slightly smaller in diameter than the cylindrical seat 38 on the axial extension 37 of the one cone 24, but slightly larger than the remainder of the extension 37, and in addition a beveled operative surface 58 which is presented outwardly at an angle with respect to its axis (FIG. 2). That angle is the complement of the angle between the axis y for the oblique bore 18 and the axis x of rotation. Moreover, the operative surface 58 lies concentric to the surface of the bore 56. Unlike the other surfaces of the target wheel 52, which are smooth, the operative surface 58 is in a sense undulated, in that it has alternating ribs 60 and spaces 62 (FIG. 4) and these ribs 60 and spaces 62, if extended inwardly, would meet at a common point along the axis of the wheel. In short, the operative surface 58 resembles the teeth on a bevel gear.

The target wheel 52 fits over the cylindrical seat 38 on the axial extension 37 of the one cone 24. Since the diameter of the bore 56 is slightly less than the diameter of the cylindrical surface 38, an interference fit exists between the axial extension 37 and the wheel 52. The friction of the interference fit maintains the target wheel 52 in the proper location on the extension 37. That position is such that the operative surface 58 is presented toward the inner end of the oblique bore 18 which extends through the outer race 2.

The sensor 54 has a case 64 provided with a reduced end 66 which is generally cylindrical and lies between a squared off inner end face 68 and a shoulder 70. The diameter of the reduced end 66 is slightly less than the diameter of the oblique bore 18. The tab 70 projects radially from the reduced end 66 to form a shoulder on the case 64, but it is not as large as the spot surface 22 of the boss 20. Near the tab 70, the reduced end 66 is provided with an annular groove 72 which contains an 0-ring 74. The remainder of the case 66 lies beyond the opposite side of the tab 70 and is somewhat larger than the reduced end 66, but not as large as the spot surface 20. This portion of the case 64 has a flexible electrical conduit 76 emerging from it at a suitable grommet which prevents the ingress of contaminants into the case 64.

Figure 5:
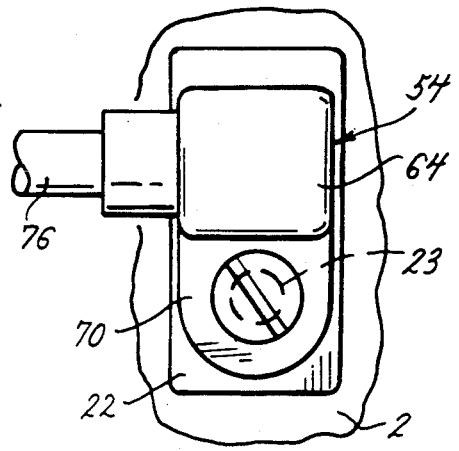
FIG. 5 is an end view of the sensor taken along line 5—5 of FIG. 2.

The sensor 54 is fitted to the outer race 2 with its reduced end 66 located in the oblique bore 18 and its tab 70 against the spot surface 22 on the boss 20 (FIGS. 2 & 5). Thus, the spot surface 22 serves as a reference surface for locating the sensor 54 axially in the oblique bore 54. The tab 70 is provided with an aperture which registers the threaded hole 23 in the boss 20. The tab 70 is secured against the spot surface 22 at the boss 20 with a machine screw 78 which extends through the aperture and threads into the threaded hole 23. The 0-ring 74 compresses within its groove 72 and establishes a fluid-tight seal between the reduced end 66 of the sensor 54 and the outer race 2 so that contaminants cannot enter the interior of the outer race 2 through the oblique bore 18.

When the sensor 54 is so fitted to the outer race 2, the inner end face 68 on the reduced end of the sensor 54 lies opposite the beveled operative surface 58 of the target wheel 52. Indeed, it lies parallel to the operative surface 58, but a short distance from it, so that a gap g (FIG. 2) exists between the ribs 60 on the operative surface 58 and the inner end face 68 of the sensor 54. The gap g should be quite small, lest the sensor 54 will produce a signal that may be too weak for the controller of an antilock braking system to utilize.

In this regard, the enlarged portion of the case 64 contains a permanent magnetic, the magnetic field of which passes through a pole piece located within the reduced end 66 of the case 64. The reduced end 66 also contains a coil which encircles the pole piece and the leads from the coil pass into and through the flexible conduit 76. As the alternating ribs 60 and spaces 62 on the target wheel 52 move past the end face 68 of the sensor 54, due to the rotation of the wheel 52, they disrupt the magnetic field and induce an alternating current in the coil. That alternating current appears as variations in voltage across the leads of the coil, and its frequency reflects the angular velocity of the target wheel 52. The magnitude of the voltage is inversely proportional to the size of the gap g between the operative surface 58 of the target wheel 52 and the inner end face 68 of the sensor 54. Thus, it is important to assemble the bearing assembly A with the correct gap g.

Other types of target wheels and sensors are suitable for use in the bearing assembly A in lieu of the toothed target wheel 52 and variable reluctance sensor 54 previously described. But irrespective of the type of target wheel and sensor employed, the size of the gap g between the target wheel and the sensor is important and should be kept relatively small and within close tolerances.

Figure 3:
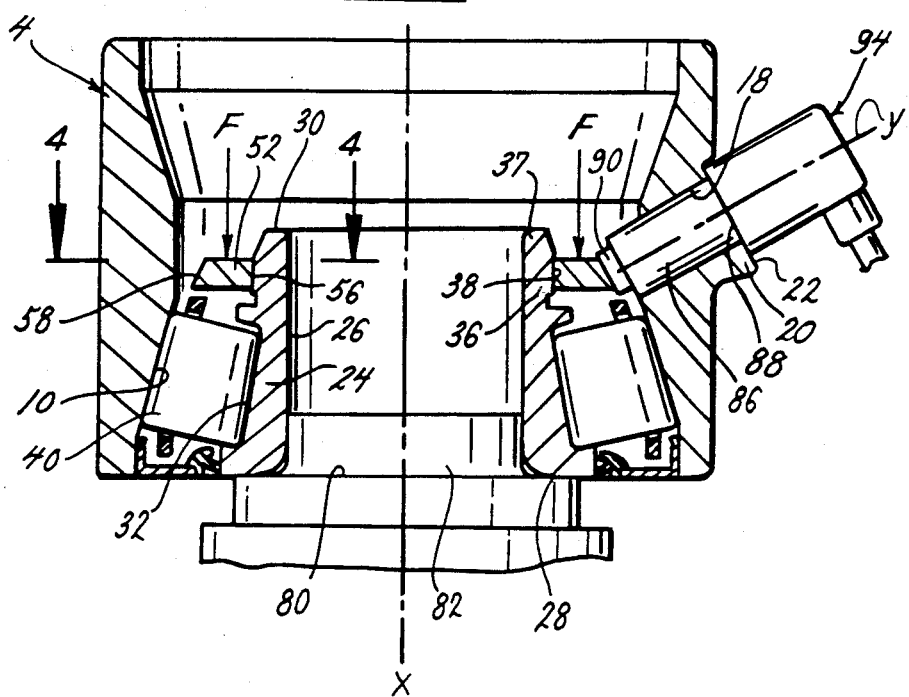
FIG. 3 is a schematic view showing the installation of the target wheel in the bearing assembly.

In order to assemble the bearing assembly A with the proper gap g between the operative surface 58 of its target wheel 52 and the end face 68 of its sensor 54, the target wheel 52 is placed over the axial extension 37 of the extended cone 24 at end face 30 and is perhaps pressed slightly onto the cylindrical seat 38. However, the target wheel 52 is not, upon being initially fitted to the end rib 36, advanced to its final position. With the target wheel 52 so fitted, the extended cone 24 on which it is carried is placed on a horizontal work surface 80 (FIG. 3) and around a cylindrical boss 82 which rises from the surface 90, with the back face 28 of that cone 24 facing downwardly and being against the surface 80. The axial extension 37 thus projects upwardly and the target wheel 52 is presented at the upper end of the cone 24. The cage 42, of course, keeps the tapered rollers 40 around the raceway 32 in the annular groove formed by the thrust and end ribs 34 and 36, but the rollers 40 drop downwardly against the thrust rib 34. Next the outer race 2 is lowered over the extended cone 24 to bring one of its raceways 10 against the tapered rollers 40. Thereupon, several oscillations are imparted to the outer race 2 under a light axial force, and this causes the rollers 40 to seat properly along the raceways 10 and 32 of the outer race 2 and cone 24, respectively, and against the thrust rib 34 of the cone 24.

A light force, which is directed downwardly, is then exerted on the outer race 2 to stabilize it over the cone 24. With the outer race 2 stabilized, a gage 84 (FIG. 3) is inserted into the oblique bore 18 of the outer race 2 and advanced until it seats against the spot surface 20. The gage 84 in effect measures the distance between the spot surface 20 on the boss 22 of the outer race 2 and the operative surface 58 of target wheel 52. The gage 84 in a sense resembles the sensor 54 in that it has a body 86 which slips easily into the oblique bore 18 and a shoulder 88 which comes to rest against the spot surface 20, thereby establishing the position of the gage 84 in the bore 18. The inner end of the gage body 86 lies at the intervening surface 12 of the outer race 2, and here the gage 84 is provided with a probe 90 or some other device for sensing the position of the operative surface 58 on the target wheel 52.

After the gage 84 is installed in outer race 2, enough force F (FIG. 3) is exerted on the target wheel 52 to advance it over the cylindrical surface 38 of the axial extension for the cone 24 that rests on the work surface 80. As the target wheel 52 moves axially downwardly, the probe 90 detects the increase in the distance between the spot surface 20 of the outer race 2 and the operative surface 58 of the target wheel 52. When this distance registers a desired magnitude, the force is removed.

Now the actual sensor 54 is installed on the outer race 2, its reduced end being inserted into the oblique bore 18 until the tab 70 comes against the spot surface 20, whereupon the machine screw 78 is inserted through the tab 70 and engaged with the threads of the hole 23. The screw 78 is turned down against the tab 70 to secure the sensor 54 firmly to the outer race 2. Thus, the spot surface 20 serves as a reference surface for both the gage 84 and the sensor 54. The inner end face 68 of the sensor 54 locates opposite the operative surface 58 of the target wheel 52 with the gap g between the two being of the prescribed magnitude. The only factor which will cause a deviation from the prescribed magnitude for the gap is the length tolerance permitted in the manufacture of the sensor 54, particularly the tolerance in the dimension between the tab 70 and the end face 68, but that tolerance can be controlled with considerable precision.

To complete the assembly, the other cone 24 is installed into the opposite end of the outer race so that the tapered rollers 40 carried by it lie along the other raceway 10. Finally, the seals 44 are fitted into the two end bores 14 of the outer race 2, and they serve to unitize the bearing assembly A, at least for handling purposes.

This invention is intended to cover all changes and modifications of the example of the invention herein chosen for purposes of the disclosure which do not constitute departures from the spirit and scope of the invention.

What is claimed is:

1. A bearing assembly having an axis of rotation, said bearing assembly comprising: an outer race having a pair of raceways presented inwardly toward the axis of rotation and a bore which is offset from the raceways and lies at an oblique angle with respect to the axis of rotation; a pair of inner races located within the outer race and each having a raceway that is presented outwardly toward a raceway of the outer race, so that the one raceway of the outer race encircles the raceway of one of the inner races and the other raceway of the outer race encircles the raceway of the other inner race, one of the inner races having an axially directed seat; rolling elements arranged in two rows between the raceways of the outer and inner races; seals located between the outer race and the two inner races to isolate the region in which the raceways and the two rows of rolling elements are located and into which the inner end of the oblique bore opens; a sensor located in the oblique bore and having an inner end which is in the region isolated by the seals; and a target wheel located on the axially directed seat of the one inner race such that it can be moved axially on the seat, the target wheel having an operative surface which is oblique to the axis of rotation and is presented toward the inner end of the sensor such that a gap exists between the operative surface and the inner end of the sensor, with the size of the gap being dependent on the position of the target wheel along the axially directed seat, the target wheel along its operative surface cooperating with the sensor to produce a pulsating signal when inner races rotate within the outer race, with the frequency of the signal reflecting the angular velocity.

2. A bearing assembly having an axis of rotation, said bearing assembly comprising: a nonrotative first race having a raceway and a bore which is axially offset from the raceway and oblique to the axis of rotation; a rotatable second race having a raceway that is presented toward the raceway of the first race and a cylindrical seat which is axially offset from that raceway; rolling elements located between the raceways of the first and second races to enable the second race to rotate relative to the first race about the axis of rotation; a target wheel located along the cylindrical seat such that it can be moved axially along the seat, the target wheel having an operative surface that is oblique to the axis of rotation and is presented toward an end of the oblique bore in the first race; and a sensor located within the oblique bore and having an end which is presented toward the operative surface of the target wheel such that a gap exists between the end of the sensor and the operative surface of the target wheel, whereby the size of the gap is dependent of the axial location of the target wheel on the cylindrical surface.

3. A bearing according to claim 2 wherein the first race encircles the second race.

4. A bearing according to claim 2 wherein the oblique bore extends through the first race and has one end which is presented toward the second race and another end which is presented away from the second race; wherein the first race has a reference surface located at that end of the bore that is presented away from the second race; and wherein the sensor has a shoulder which lies against the reference surface to establish the location of the sensor in the bore.

5. A bearing according to claim 2 wherein the sensor has a tab which lies over and is secured against the reference surface to attach the sensor to the outer race.

6. A bearing assembly according to claim 2 and further comprising a seal located between the first and second races for establishing a barrier between those races and thereby isolating the rolling elements and raceways, and wherein the target wheel is located behind the seal so that it is likewise isolated.

7. A bearing assembly according to claim 2 wherein an interference fit exists between the target wheel and the axially directed seat and friction holds the target wheel in place on the seat.

8. A bearing assembly according to claim 7 wherein the target wheel is located between the two rows of rolling elements.

9. A bearing assembly according to claim 8 wherein the inner races abut within the outer race and the seat is in the region of the abutment.

10. A bearing assembly according to claim 8 wherein the outer race has a reference surface located at the outer end of the oblique bore, and the sensor has a shoulder which fits against the reference surface to establish the position of the sensor in the oblique bore.

11. A bearing assembly according to claim 10 wherein the raceways are tapered and the rolling elements are tapered rollers, the taper of the raceways being such that the small ends of the tapered rollers in the two rows are presented toward the target wheel; and wherein the inner races have end ribs which project axially beyond the small ends of their raceways and the axially directed seat is attached to and projects axially beyond the end rib for one of the inner races.

12. A bearing assembly according to claim 11 wherein the inner races abut within the outer race.

* * * * *